(12) United States Patent
Guo et al.

(10) Patent No.: US 10,153,847 B2
(45) Date of Patent: Dec. 11, 2018

(54) CHROMATIC DISPERSION DETECTION METHOD AND DEVICE FOR OPTICAL TRANSMISSION NETWORK AND STORAGE MEDIUM

(71) Applicant: Sanechips Technology Co., Ltd., Shenzhen, Guangdong (CN)

(72) Inventors: Jizheng Guo, Shenzhen (CN); Cheng Yu, Shenzhen (CN); Haitao Zhou, Shenzhen (CN); Xianjun Zeng, Shenzhen (CN)

(73) Assignee: SANECHIPS TECHNOLOGY CO., LTD., Shenzhen, Guangdong (CN)

( * ) Notice: Subject to any disclaimer, the term of this patent is extended or adjusted under 35 U.S.C. 154(b) by 16 days.

(21) Appl. No.: 15/506,105

(22) PCT Filed: Apr. 8, 2015

(86) PCT No.: PCT/CN2015/076092
§ 371 (c)(1),
(2) Date: Feb. 23, 2017

(87) PCT Pub. No.: WO2016/029696
PCT Pub. Date: Mar. 3, 2016

(65) Prior Publication Data
US 2018/0159635 A1 Jun. 7, 2018

(30) Foreign Application Priority Data
Aug. 25, 2014 (CN) .......................... 2014 1 0421123

(51) Int. Cl.
*H04B 10/08* (2006.01)
*H04B 17/00* (2015.01)
(Continued)

(52) U.S. Cl.
CPC ... *H04B 10/6161* (2013.01); *H04B 10/07951* (2013.01); *H04B 10/58* (2013.01); *H04B 10/6162* (2013.01); *H04B 10/25133* (2013.01)

(58) Field of Classification Search
USPC .................................................. 398/25, 205
See application file for complete search history.

(56) References Cited

U.S. PATENT DOCUMENTS 6,643,603 B2 11/2003 Aoki
8,406,635 B2 * 3/2013 Nakashima ............ H04B 10/60
375/316
(Continued)

FOREIGN PATENT DOCUMENTS

CN 1649086 A 8/2005
CN 100437895 C 11/2008
(Continued)

OTHER PUBLICATIONS

K. Fahy, "Fast Fourier Transforms and Power Spectra in LabVIEW", Feb. 1993, National Instruments Corporation, pp. 1-2.*
(Continued)

*Primary Examiner* — David Payne
*Assistant Examiner* — Pranesh Barua
(74) *Attorney, Agent, or Firm* — Cooper Legal Group, LLC

(57) ABSTRACT

The disclosure discloses a Chromatic Dispersion (CD) detection method for an optical transmission network. Data of two polarization states orthogonal to each other is converted from time-domain data to frequency-domain data, extraction is performed on the frequency-domain data and a linear combination operation is performed on the extracted frequency-domain data, an argument of a CD value of the data of the two polarization states are obtained according to a result of the linear combination operation, and the CD (Continued)

value is estimated according to the argument of the CD value of the data of the two polarization states. The disclosure further discloses a CD detection device for the optical transmission network and a storage medium.

12 Claims, 2 Drawing Sheets

(51) Int. Cl.
*H04B 10/06* (2006.01)
*H04B 10/61* (2013.01)
*H04B 10/079* (2013.01)
*H04B 10/58* (2013.01)
*H04B 10/2513* (2013.01)

(56) References Cited

U.S. PATENT DOCUMENTS

| | | | |
|---|---|---|---|
| 8,705,986 B2 | 4/2014 | Sun | |
| 2009/0116600 A1* | 5/2009 | Muthu-Manivannan | H04B 3/54 375/371 |
| 2009/0228766 A1 | 9/2009 | Djordjevic | |
| 2009/0324226 A1 | 12/2009 | Buchali | |
| 2010/0080556 A1 | 4/2010 | Takita | |
| 2010/0142946 A1* | 6/2010 | Liu | H04B 10/07951 398/29 |
| 2010/0209101 A1 | 8/2010 | Hirano | |
| 2011/0182582 A1 | 7/2011 | Yang | |
| 2011/0305464 A1* | 12/2011 | Goldfarb | H04B 10/50597 398/208 |
| 2012/0070159 A1 | 3/2012 | Ishihara | |
| 2012/0128376 A1* | 5/2012 | Sun | H04B 10/6161 398/208 |
| 2013/0243422 A1 | 9/2013 | Hauske | |
| 2013/0302031 A1* | 11/2013 | Tanimura | H04B 10/5057 398/38 |
| 2014/0016927 A1* | 1/2014 | Khatana | H04B 10/61 398/25 |
| 2016/0329960 A1* | 11/2016 | Yao | H04B 10/07951 |

FOREIGN PATENT DOCUMENTS

| | | |
|---|---|---|
| CN | 101447834 A | 6/2009 |
| CN | 101753217 A | 6/2010 |
| CN | 102142905 A | 8/2011 |
| CN | 102324997 A | 1/2012 |
| CN | 103430003 A | 12/2013 |
| EP | 2434665 A1 | 3/2012 |
| WO | 2013185845 A1 | 12/2013 |

OTHER PUBLICATIONS

International Search Report in international application No. PCT/CN2015/076092, dated Jun. 30, 2015, 2 pages.
English Translation of the Written Opinion of the International Search Authority in international application No. PCT/CN2015/076092, dated Jun. 30, 2015, 5 pages.
Supplementary European Search Report in European application No. 15836728.4, dated Jul. 6, 2017, 12 pages.
"Chromatic Dispersion Estimation in Digital Coherent Receivers", Ruben Andres Soriano, Fabian N. Hauski, Neil Guerrero Gonzalea, Zhuhong Zhang, Yabin Ye and Idelfonso Tafur Monroy, Jun. 1, 2011, Journal of Lightwave Technology , vol. 29 No. 11, pp. 1627-1637.

* cited by examiner

CHROMATIC DISPERSION DETECTION METHOD AND DEVICE FOR OPTICAL TRANSMISSION NETWORK AND STORAGE MEDIUM

TECHNICAL FIELD

The disclosure relates to an optical communication technology, and more particularly to a Chromatic Dispersion (CD) detection method and device for an optical transmission network and a storage medium.

BACKGROUND

In an optical transmission network, with increase of a transmission length and a transmission baud rate, for example, in a 100 Gbps ultralong-distance optical transmission network, CD generated an optical signal in a transmission process becomes increasingly serious, and the CD may cause distortion of the transmitted signal, thereby resulting in a transmission error. In order to eliminate influence of the CD, it is necessary to compensate for the CD, and the key for CD compensation is to accurately estimate a CD value.

SUMMARY

In order to solve the existing technical problem, embodiments of the disclosure are desired to provide a CD detection method and device for an optical transmission network and a storage medium.

The technical solutions of the embodiments of the disclosure are implemented as follows.

The embodiments of the disclosure provide a CD detection method for an optical transmission network comprising:

converting data of two polarization states orthogonal to each other from time-domain data to frequency-domain data, performing extraction on the frequency-domain data and performing a linear combination operation on the extracted frequency-domain data, obtaining an argument of a CD value of the data of the two polarization states according to a result of the linear combination operation, and estimating the CD value according to the argument of the CD value of the data of the two polarization states.

The embodiments of the disclosure further provide a CD detection device for an optical transmission network comprising: a data conversion module, a data extraction module, a linear combination operation module, an argument acquisition module and a CD estimation module, the data conversion module is configured to convert data of two polarization states orthogonal to each other from time-domain data to frequency-domain data;

the data extraction module is configured to perform extraction on the frequency-domain data, and send the extracted frequency-domain data to the linear combination operation module;

the linear combination operation module is configured to perform a linear combination operation on the extracted frequency-domain data, and send a result of the linear combination operation to the argument acquisition module;

the argument acquisition module is configured to obtain an argument of a CD value of the data of the two polarization states according to the result of the linear combination operation, and send the argument of the CD value to the CD estimation module; and the CD estimation module is configured to estimate the CD value according to the argument of the CD value of the data of the two polarization states.

The embodiments of the disclosure further provide a computer storage medium in which a computer program is stored for execution of the above CD detection method for the optical transmission network.

The embodiments of the disclosure provide the CD detection method and device for the optical transmission network and the storage medium, data of two polarization states orthogonal to each other is converted from time-domain data to frequency-domain data, extraction is performed on the frequency-domain data and a linear combination operation is performed on the frequency-domain data, an argument of a CD value of the data of the two polarization states is obtained according to a result of the linear combination operation, and the CD value is estimated according to the argument of the CD value of the data of the two polarization states; as such, an electric domain estimation may be performed on CD of the optical transmission network to implement CD detection for the optical transmission network.

DETAILED DESCRIPTION

In the embodiments of the disclosure, data of two polarization states orthogonal to each other is converted from time-domain data to frequency-domain data, extraction is performed on the frequency-domain data and a linear combination operation is performed on the extracted frequency-domain data, an argument of a CD value of the data of the two polarization states is obtained according to a result of the linear combination operation, and the CD value is estimated according to the argument of the CD value of the data of the two polarization states.

The disclosure will be further described in detail below with reference to the drawings and specific embodiments.

Figure 1:
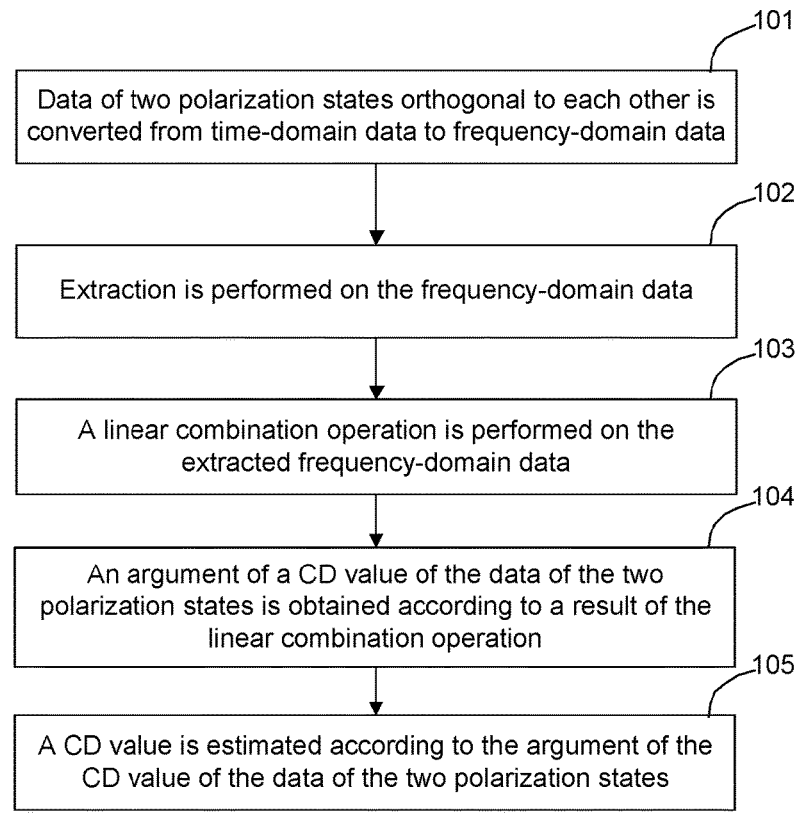
FIG. 1 is a schematic diagram of implementation of a flow of a CD detection method for an optical transmission network according to an embodiment of the disclosure.

The embodiments of the disclosure implement a CD detection method for an optical transmission network. As shown in FIG. 1, the method includes the following steps.

In Step 101: data of two polarization states orthogonal to each other is converted from time-domain data to frequency-domain data.

In the step, a special algorithm of discrete Fourier transform, i.e. Fast Fourier Transform (FFT), is adopted for implementation, with $N=2^t$ and t being a natural number, and the frequency-domain data converted from the data of the two polarization states being set as $X(k)$ and $Y(k)$, $k=0, 1, \ldots, N-1$, then $$Z(k) = \sum_{n=0}^{N-1} z(n) W_N^{nk}, k = 0, 1, \ldots, N-1, \text{ and}$$

$$Z(k) = X(k) + i \cdot Y(k),$$

where $$W_N = e^{-j\frac{2\pi}{N}},$$

$z(n)$ represents a sampled time-domain signal sequence, $z(n)=x(n)+i\cdot y(n)$, and consists of the data $x(n)$ and $y(n)$ of the polarization states in two orthogonal dimensions, and $Z(k)$ is a frequency-domain signal corresponding to the sequence $z(n)$.

In Step 102: extraction is performed on the frequency-domain data.

In the step, the data is extracted from the frequency-domain data according to the following rules:

$$X^U[k] = X\left[k + \frac{N}{4} - \frac{M}{2}\right], X^L[k] = X\left[k + \frac{3N}{4} - \frac{M}{2}\right], \text{ and}$$

$$Y^U[k] = X\left[k + \frac{N}{4} - \frac{M}{2}\right], Y^L[k] = X\left[k + \frac{3N}{4} - \frac{M}{2}\right],$$

where $X^U[k]$ represents upper sideband data extracted from $X(k)$, $X^L[k]$ represents lower sideband data extracted from $X(k)$, $Y^U[k]$ represents upper sideband data extracted from $Y(k)$, $Y^L[k]$ represents lower sideband data extracted from $Y(k)$, $$M = \frac{N}{8},$$

and M may be also designated according to the specific precision requirement, where $k=0, 1, \ldots, M-1$.

In Step 103: a linear combination operation is performed on the extracted frequency-domain data.

Here, the following steps are included.

In Step 103a: two groups of sequences $X_1^{(U)}$, $X_2^{(U)}$ and $X_3^{(U)}$ as well as $X_1^{(L)}$, $X_2^{(L)}$ and $X_3^{(L)}$ in three different directions are obtained according to $X^U[k]$, $X^L[k]$, $Y^U[k]$ and $Y^L[k]$:

$$\begin{cases} X_1^{(U)}[k] = \sqrt{2}\, X^{(U)}[k] \\ X_2^{(U)}[k] = X^{(U)}[k] + \sqrt{-1}\cdot Y^{(U)}[k] \\ X_3^{(U)}[k] = X^{(U)}[k] + Y^{(U)}[k] \end{cases}$$

$$\begin{cases} X_1^{(L)}[k] = \sqrt{2}\, X^{(L)}[k] \\ X_2^{(L)}[k] = X^{(L)}[k] + \sqrt{-1}\cdot Y^{(L)}[k] \\ X_3^{(L)}[k] = X^{(L)}[k] + Y^{(L)}[k] \end{cases}$$

where $k=0, 1, \ldots, N-1$.

In Step 103b: conjugate multiplication is performed on the two groups of sequences $X_1^{(U)}$, $X_2^{(U)}$ and $X_3^{(U)}$ as well as $X_1^{(L)}$, $X_2^{(L)}$ and $X_3^{(L)}$ in the three different directions to obtain a CD sub-sequence $R_1[k]$, $R_2[k]$ and $R_3[k]$ in the three different directions:

$$R_n[k] = X_n^{(U)}[k]\cdot \operatorname{conj}\{X_n^{(L)}[k]\},$$

where $\operatorname{conj}(\bullet)$ is a conjugate operation, $k=0, \ldots N-1$ and $n=1, 2, 3$.

In Step 103c: a first interval value is set as $\Delta_1=2$ and a second interval value is set as $\Delta_2=32$, and accumulated values $F_1$ and $F_2$ corresponding to these two interval values in different directions are calculated according to $R_1[k]$, $R_2[k]$ and $R_3[k]$:

$$F_1 = \sum_{n=1}^{3}\sum_{k=0}^{N-\Delta_1} R_n[k]\cdot \operatorname{conj}(R_n[k+\Delta_1]), \text{ and}$$

$$F_2 = \sum_{n=1}^{3}\sum_{k=0}^{N-\Delta_2} R_n[k]\cdot \operatorname{conj}(R_n[k+\Delta_2]).$$

In Step 103d: low-pass filtering is performed on a number T of accumulated values $F_1$ and a number M of accumulated values $F_2$ thus obtained to get $\overline{F_1}$ and $\overline{F_2}$:

$$\overline{F_1} = \sum_{k1=0}^{T-1} F_1[k1], \text{ and}$$

$$\overline{F_2} = \sum_{k2=0}^{M-1} F_2[k2],$$

where $k1=0, 1, \ldots, T-1$, and $k2=0, 1, \ldots, M-1$.

In Step 103e: two registers Buffer1 and Buffer2 with a length L are constructed, Buffer1 stores $\overline{F_1}$ calculated for recent L times, Buffer2 stores $\overline{F_2}$ calculated for recent L times, initial values of Buffer1 and Buffer2 are both a number L of zeros, data in the Buffer1 is summed to obtain $F_{1\_sum}$, and data in Buffer2 is summed to obtain $F_{2\_sum}$:

$$F_{1\_sum} = \sum_{k=1}^{L} \overline{F_1}[k], \text{ and}$$

$$F_{2\_sum} = \sum_{k=1}^{L} \overline{F_2}[k],$$

here, a value of L may be configured, and may be selected from [16, 32, 64, 128], and a default value of L is 16.

In Step 104: the argument of the CD value of the data of the two polarization states is obtained according to the result of the linear combination operation;

particularly, the arguments $\varphi_1$ and $\varphi_2$ of the CD values of the data of the two polarization states are calculated respectively according to $F_{1\_sum}$ and $F_{2\_sum}$:

$$\varphi_1 = \frac{1}{2\pi}\arg(F_{1\_sum}), \text{ and}$$

$$\varphi_2 = \frac{1}{2\pi}\arg(F_{2\_sum}),$$

where both $\varphi_1$ and $\varphi_2$ belong to an interval [0,1).

In Step 105: the CD value is estimated according to the argument of the CD value of the data of the two polarization states, particularly, a CD estimation coefficient $\varphi_1'$ is obtained according to the arguments $\varphi_1$ and $\varphi_2$ of the CD value of the data of the two polarization states, and a specific process is as follows:

$m = \operatorname{floor}(\varphi_1 \times 16)$, and $u = \varphi_1 \times 16 - m$, where $\operatorname{floor}(\bullet)$ represents rounding down;

$\varphi_2 u = \varphi_2 - u$, and when $\varphi_2 u \geq 0.5$, $u' = \varphi_2 - 1$;

when $\varphi_2 u < -0.5$, $u' = \varphi_2 + 1$; and when $-0.5 \leq \varphi_2 u < 0.5$, $u' = \varphi_2$;

$\varphi_1' = m + u'$, $\varphi_1'' = \varphi_1'/32$, and if $\varphi_1'' \geq 0.25$, a value obtained by $\varphi_1'' - 0.5$ is reassigned to $\varphi_1''$; and the CD value CD is estimated according to the CD estimation coefficient $\varphi_1''$:

CD=$\varphi_1'' \times$ delta_CD, where delta_CD=$1000 \times C \times N\_fft/(2 \times f^2 \times lambda^2)$, C is a light velocity in an optical fibre, N_fft is an FFT transformation length, f is a symbol rate, lambda is a wavelength, and for specific values, refer to Table 1.

TABLE 1

| Name | Range | Description |
|---|---|---|
| C | About $3 \times 10^8$ m/s | Light velocity in optical fibre |
| N_fft | N | FFT transformation length |
| f | 32 GHz, 28 GHz and the like | Symbol rate |
| lambda | 1,529~1,561 nm (C waveband) | Wavelength |
|  | 1,529~1,568 nm (CE waveband) |  |
|  | 1,570~1,605 nm (L waveband) |  |

Figure 2:
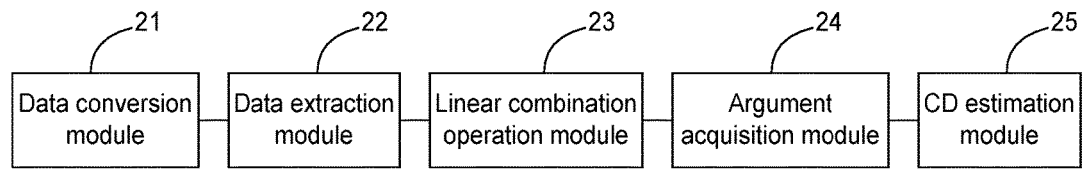
FIG. 2 is a schematic diagram of implementation of a structure of a CD detection device for an optical transmission network according to an embodiment of the disclosure.

In order to implement the abovementioned method, the disclosure further provides a CD detection device for an optical transmission network. As shown in FIG. 2, the device includes a data conversion module 21, a data extraction module 22, a linear combination operation module 23, an argument acquisition module 24 and a CD estimation module 25, in the device:

the data conversion module 21 is configured to convert data of two polarization states orthogonal to each other from time-domain data to frequency-domain data;

the data extraction module 22 is configured to perform extraction on the frequency-domain data, and send the extracted frequency-domain data to the linear combination operation module 23;

the linear combination operation module 23 is configured to perform a linear combination operation on the extracted frequency-domain data, and send a result of the linear combination operation to the argument acquisition module 24;

the argument acquisition module 24 is configured to obtain an argument of a CD value of the data of the two polarization states according to the result of the linear combination operation, and send the argument of the CD value to the CD estimation module 25; and the CD estimation module 25 is configured to estimate the CD value according to the argument of the CD value of the data of the two polarization states.

The data conversion module 21 is specifically configured to convert the data of the two polarization states into the frequency-domain data by adopting a discrete Fourier transform, with $N=2^t$ and t being a natural number, and the frequency-domain data converted from the data of the two polarization states being set as X(k) and Y(k) respectively, k=0, 1, ..., N−1, then:

$$Z(k) = \sum_{n=0}^{N-1} z(n) W_N^{nk}, k = 0, 1, \ldots, N-1, \text{ and}$$

$$Z(k) = X(k) + i \cdot Y(k),$$

where $$W_N = e^{-j\frac{2\pi}{N}},$$

z(n) represents a sampled time-domain signal sequence, $z(n)=x(n)+i \cdot y(n)$, and consists of the data x(n) and y(n) of the polarization states in two dimensions orthogonal to each other, and Z(k) is a frequency-domain signal corresponding to the sequence z(n).

The data extraction module 22 is specifically configured to extract data from the frequency-domain data according to the following rules:

$$X^U[k] = X\left[k + \frac{N}{4} - \frac{M}{2}\right], X^L[k] = X\left[k + \frac{3N}{4} - \frac{M}{2}\right], \text{ and}$$

$$Y^U[k] = X\left[k + \frac{N}{4} - \frac{M}{2}\right], Y^L[k] = X\left[k + \frac{3N}{4} - \frac{M}{2}\right],$$

where $X^U[k]$ represents upper sideband data extracted from X(k), $X^L[k]$ represents lower sideband data extracted from X(k), $Y^U[k]$ represents upper sideband data extracted from Y(k), $Y^L[k]$ represents lower sideband data extracted from Y(k), $$M = \frac{N}{8},$$

and M may be also designated according to the specific precision requirement, where k=0, 1, ..., M−1.

The linear combination operation module 23 is specifically configured to:

1): obtain two groups of sequences $X_1^{(U)}$, $X_2^{(U)}$ and $X_3^{(U)}$ as well as $X_1^{(L)}$, $X_2^{(L)}$ and $X_3^{(L)}$ in three different directions according to $X^U[k]$, $X^L[k]$, $Y^U[k]$ and $Y^L[k]$, estimation of the sequences in the three different directions can avoid influence of polarization mode dispersion on CD estimation:

$$\begin{cases} X_1^{(U)}[k] = \sqrt{2}\, X^{(U)}[k] \\ X_2^{(U)}[k] = X^{(U)}[k] + \sqrt{-1} \cdot Y^{(U)}[k] \\ X_3^{(U)}[k] = X^{(U)}[k] + Y^{(U)}[k] \end{cases}$$

$$\begin{cases} X_1^{(L)}[k] = \sqrt{2}\, X^{(L)}[k] \\ X_2^{(L)}[k] = X^{(L)}[k] + \sqrt{-1} \cdot Y^{(L)}[k] \\ X_3^{(L)}[k] = X^{(L)}[k] + Y^{(L)}[k] \end{cases}$$

where k=0, 1, ..., N−1;

2): perform conjugate multiplication on the two groups of sequences $X_1^{(U)}$, $X_2^{(U)}$ and $X_3^{(U)}$ as well as $X_1^{(L)}$, $X_2^{(L)}$ and $X_3^{(L)}$ in the three different directions to obtain a CD sub-sequence $R_1[k]$, $R_2[k]$ and $R_3[k]$ in the three different directions:

$$R_n[k] = X_n^{(U)}[k] \cdot \text{conj}\{X_n^{(L)}[k]\},$$

where conj(•) is a conjugate operation, k=0, ... N−1 and n=1, 2, 3;

3): set a first interval value as $\Delta_1=2$ and a second interval value as $\Delta_2=32$, and calculate accumulated values $F_1$ and $F_2$ corresponding to these two interval values in different directions according to $R_1[k]$, $R_2[k]$ and $R_3[k]$:

$$F_1 = \sum_{n=1}^{3} \sum_{k=0}^{N-\Delta_1} R_n[k] \cdot conj(R_n[k+\Delta_1]), \text{ and}$$

$$F_2 = \sum_{n=1}^{3} \sum_{k=0}^{N-\Delta_2} R_n[k] \cdot conj(R_n[k+\Delta_2]).$$

4): perform low-pass filtering on a number T of accumulated values $F_1$ and a number M of accumulated values $F_2$ thus obtained to get $\overline{F_1}$ and $\overline{F_2}$:

$$\overline{F_1} = \sum_{k1=0}^{T-1} F_1[k1], \text{ and}$$

$$\overline{F_2} = \sum_{k2=0}^{M-1} F_2[k2],$$

where k1=0, 1, . . . , T−1, and k2=0, 1, . . . , M−1; and

5): construct two registers Buffer1 and Buffer2 with a length L, Buffer1 stores $\overline{F_1}$ calculated for recent L times, Buffer2 stores $\overline{F_2}$ calculated for recent L times, initial values of Buffer1 and Buffer2 are both a number L of zeros, data in the Buffer1 is summed to obtain $F_{1\_sum}$, and data in Buffer2 is summed to obtain $F_{2\_sum}$.

The argument acquisition module 24 is specifically configured to calculate the arguments $\varphi_1$ and $\varphi_2$ of the CD value of the data of the two polarization states according to $F_{1\_sum}$ and $F_{2\_sum}$ respectively:

$$\varphi_1 = \frac{1}{2\pi}\arg(F_{1\_sum}) \text{ and}$$

$$\varphi_2 = \frac{1}{2\pi}\arg(F_{2\_sum}),$$

where both $\varphi_1$ and $\varphi_2$ belong to an interval [0,1).

The CD estimation module 25 is specifically configured to obtain a CD estimation coefficient $\varphi_1''$ according to the arguments $\varphi_1$ and $\varphi_2$ of the CD value of the data of the two polarization states, and estimate the CD value CD according to the CD estimation coefficient $\varphi_1'$:

CD=$\varphi_1''$×delta_CD, where delta_CD=1000×C×N_fft/(2×f$^2$×lambda$^2$), C is a light velocity in an optical fibre, N_fft is an FFT transformation length, f is a symbol rate, and lambda is a wavelength.

Figure 3:
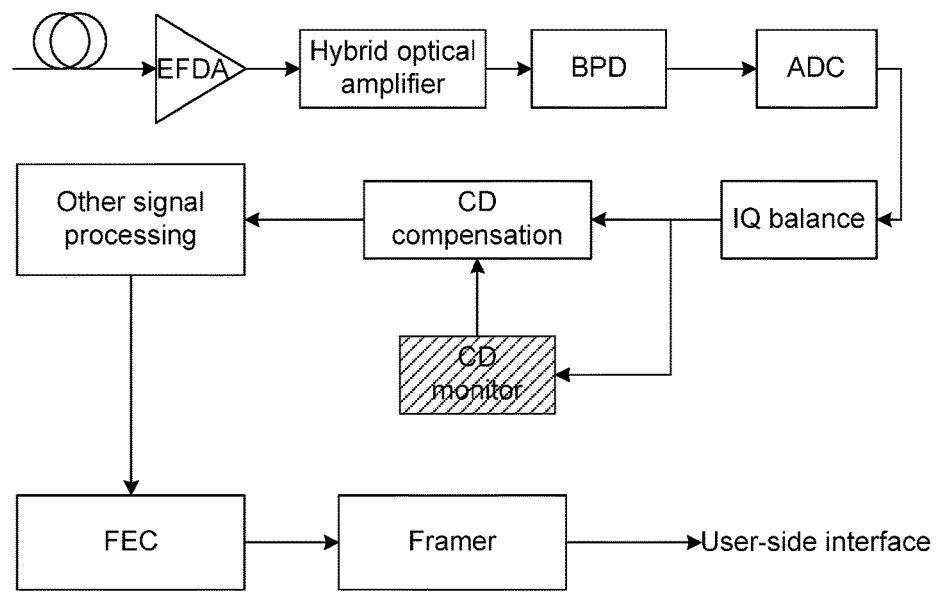
FIG. 3 is a schematic diagram of a position of a CD detection device in an optical transmission network according to an embodiment of the disclosure.

A position of the CD detection device for the optical transmission network in the optical transmission network is shown in FIG. 3. After an optical signal passes through an Optical Fibre Amplifier (Erbium-doped Optical Fibre Amplifier, EDFA), a hybrid optical amplifier, a Balanced Photodiode Detector (BPD), an Analogue-to-Digital Converter (ADC), an In-phase/Quadrature (IQ) balance, the data of the two polarization states orthogonal to each other is transmitted to the CD detection device (CD monitor) and CD compensation of the optical transmission network, the CD monitor sends the estimated CD value to the CD compensation, the CD compensation compensates for the CD value for other signal processing, and the optical signal is sent to a user-side interface after passing through a Forward Error Corrector (FEC) and a framer.

If being implemented in form of a software function module and sold or used as an independent product, the CD detection method for the optical transmission network according to the embodiments of the disclosure may also be stored in a computer-readable storage medium. Based on such an understanding, the technical solutions of the embodiments of the disclosure naturally or parts contributing to a conventional art may be embodied in form of a software product, and the computer software product is stored in a storage medium, including a plurality of instructions to enable a piece of computer equipment (which may be a personal computer, a server, network equipment or the like) to execute all or part of the method of each embodiment of the disclosure. The storage medium includes various media capable of storing program codes such as a U disk, a mobile hard disk, a Read-Only Memory (ROM), a magnetic disk or an optical disk. Therefore, the embodiments of the disclosure are not limited to any specific hardware and software combination.

Correspondingly, the embodiments of the disclosure further provide a computer storage medium in which a computer program is stored for execution of the CD detection method for the optical transmission network according to the embodiments of the disclosure.

What are described above are only the particular embodiments of the disclosure and not intended to limit the scope of protection of the disclosure. Any modifications, equivalent replacements, improvements and the like made within the spirit and principle of the disclosure shall fall within the scope of protection of the disclosure.

INDUSTRIAL APPLICABILITY

From each embodiment of the disclosure, the data of the two polarization states orthogonal to each other is converted into the frequency-domain data and a linear combination operation is performed, the argument of the CD value of the data of the two polarization states are obtained, and the CD value is estimated according to the argument of the CD value. Therefore, electric domain estimation may be performed on CD of the optical transmission network to implement CD detection of the optical transmission network.

What is claimed is:

1. A Chromatic Dispersion (CD) estimation method for an optical transmission network comprising:
    receiving data of two polarization states orthogonal to each other from an In-phase/Quadrature (IQ) balance;
    converting the data of the two polarization states orthogonal to each other from time-domain data to frequency-domain data by adopting a discrete Fourier transform, with N=2$^t$ and t being a natural number greater than 2, and the frequency-domain data converted from the data of the two polarization states being set as X(k) and Y(k) respectively, k=0, 1, . . . , N−1, then $$Z(k) = \sum_{n=0}^{N-1} z(n) W_N^{nk}, k = 0, 1, \ldots, N-1, \text{ and}$$

$$Z(k) = X(k) + i \cdot Y(k),$$

wherein $i^2=-1$;
where $$W_N = e^{-j\frac{2\pi}{N}},$$

$z(n)$ represents a sampled time-domain signal sequence, $z(n)=x(n)+i\cdot y(n)$, and consists of the data $x(n)$ and $y(n)$ of the two polarization states orthogonal to each other, and $Z(k)$ is a frequency-domain signal corresponding to the sampled time-domain signal sequence $z(n)$, where $n=0, 1, \ldots, N-1$;

performing extraction of data from the frequency-domain data according to the following rules:

$$X^U[k] = X\left[k + \frac{N}{4} - \frac{M}{2}\right], X^L[k] = X\left[k + \frac{3N}{4} - \frac{M}{2}\right], \text{ and}$$

$$Y^U[k] = X\left[k + \frac{N}{4} - \frac{M}{2}\right], Y^L[k] = X\left[k + \frac{3N}{4} - \frac{M}{2}\right],$$

where $X^U[k]$ represents upper sideband data extracted from $X(k)$, $X^L[k]$ represents lower sideband data extracted from $X(k)$, $Y^U[k]$ represents upper sideband data extracted from $Y(k)$, $Y^L[k]$ represents lower sideband data extracted from $Y(k)$, $$M = \frac{N}{8},$$

where $k=0, 1, \ldots, M-1$;
performing a linear combination operation on the extracted data from the frequency-domain data;
obtaining an argument of a CD value of the data of the two polarization states according to a result of the linear combination operation;
estimating the CD value according to the argument of the CD value of the data of the two polarization states; and
sending the CD value to a CD compensation, such that the CD compensation compensates for the CD value.

2. The CD estimation method according to claim 1, wherein performing the linear combination operation on the extracted data from the frequency-domain data comprises:
step a: obtaining two groups of sequences $X_1^{(U)}$, $X_2^{(U)}$ and $X_3^{(U)}$ as well as $X_1^{(L)}$, $X_2^{(L)}$ and $X_3^{(L)}$ in three different directions according to $X^U[k]$, $X^L[k]$, $Y^U[k]$ and $Y^L[k]$:

$$\begin{cases} X_1^{(U)}[k] = \sqrt{2}\, X^{(U)}[k] \\ X_2^{(U)}[k] = X^{(U)}[k] + \sqrt{-1} \cdot Y^{(U)}[k] \\ X_3^{(U)}[k] = X^{(U)}[k] + Y^{(U)}[k] \end{cases}$$

$$\begin{cases} X_1^{(L)}[k] = \sqrt{2}\, X^{(L)}[k] \\ X_2^{(L)}[k] = X^{(L)}[k] + \sqrt{-1} \cdot Y^{(L)}[k] \\ X_3^{(L)}[k] = X^{(L)}[k] + Y^{(L)}[k] \end{cases}$$

where $k=0, 1, \ldots, N-1$;
step b: performing conjugate multiplication on the two groups of sequences $X_1^{(U)}$, $X_2^{(U)}$ and $X_3^{(U)}$ as well as $X_1^{(L)}$, $X_2^{(L)}$ and $X_3^{(L)}$ to obtain a CD sub-sequence $R_1[k]$, $R_2[k]$ and $R_3[k]$ in the three different directions:

$$R_n[k] = X_n^{(U)}[k] \cdot \text{conj}\{X_n^{(L)}[k]\},$$

where $\text{conj}(\bullet)$ is a conjugate operation, $k=0, \ldots, N-1$ and $n=1, 2, 3$;

step c: setting a first interval value as $\Delta_1=2$ and a second interval value as $\Delta_2=32$, and calculating accumulated values $F_1$ and $F_2$ corresponding to these two interval values in different directions according to $R_1[k]$, $R_2[k]$ and $R_3[k]$:

$$F_1 = \sum_{n=1}^{3} \sum_{k=0}^{N-\Delta_1} R_n[k] \cdot \text{conj}(R_n[k + \Delta_1]), \text{ and}$$

$$F_2 = \sum_{n=1}^{3} \sum_{k=0}^{N-\Delta_2} R_n[k] \cdot \text{conj}(R_n[k + \Delta_2]);$$

step d: performing low-pass filtering on a number T of accumulated values $F_1$ and a number M of accumulated values $F_2$ thus obtained to get $\overline{F_1}$ and $\overline{F_2}$:

$$\overline{F_1} = \sum_{k1=0}^{T-1} F_1[k1], \text{ and}$$

$$\overline{F_2} = \sum_{k2=0}^{M-1} F_2[k2],$$

where $k1=0, 1, \ldots, T-1$, and $k2=0, 1, \ldots, M-1$; and
step e: constructing two registers Buffer1 and Buffer2 with a length L, wherein Buffer1 stores $\overline{F_1}$ calculated for recent L times, Buffer2 stores $\overline{F_2}$ calculated for recent L times, initial values of Buffer1 and Buffer2 are both a number L of zeros, data in the Buffer1 is summed to obtain $F_{1\_sum}$, and data in Buffer2 is summed to obtain $F_{2\_sum}$:

$$F_{1\_sum} = \sum_{k=1}^{L} \overline{F_1}[k], \text{ and}$$

$$F_{2\_sum} = \sum_{k=1}^{L} \overline{F_2}[k],$$

here, a value of L is selected from [16, 32, 64, 128].

3. The CD estimation method according to claim 2, wherein obtaining the argument of the CD value of the data of the two polarization states according to the result of the linear combination operation comprises: calculating arguments $\varphi_1$ and $\varphi_2$ of the CD value of the data of the two polarization states according to $F_{1\_sum}$ and $F_{2\_sum}$ respectively:

$$\varphi_1 = \frac{1}{2\pi} \arg(F_{1\_sum}) \text{ and}$$

$$\varphi_2 = \frac{1}{2\pi} \arg(F_{2\_sum}),$$

where both $\varphi_1$ and $\varphi_2$ belong to an interval [0,1).

4. The CD estimation method according to claim 3, wherein estimating the CD value according to the argument of the CD value of the data of the two polarization states comprises: obtaining a CD estimation coefficient $\varphi_1''$ according to the arguments $\varphi_1$ and $\varphi_2$ of the CD value of the data of the two polarization states, and estimating the CD value CD according to the CD estimation coefficient $\varphi_1''$:

$$CD = \varphi_1'' \times delta\_CD,$$

where $delta\_CD = 1000 \times C \times N\_fft/(2 \times f^2 \times lambda^2)$, C is a light velocity in an optical fibre, N_fft is a discrete Fourier transform length, f is a symbol rate, and lambda is a wavelength.

5. A Chromatic Dispersion (CD) estimation device for an optical transmission network comprising:
a processor; and
a memory for storing instructions executable by the processor;
wherein the processor is configured to:
receive data of two polarization states orthogonal to each other from an In-phase/Quadrature (IQ) balance;
convert the data of the two polarization states orthogonal to each other from time-domain data to frequency-domain data by adopting a discrete Fourier transform, with $N=2^t$ and t being a natural number greater than 2, and the frequency-domain data converted from the data of the two polarization states being set as X(k) and Y(k) respectively, $k=0, 1, \ldots, N-1$, then $$Z(k) = \sum_{n=0}^{N-1} z(n) W_N^{nk}, k = 0, 1, \ldots, N-1, \text{ and}$$

$$Z(k) = X(k) + i \cdot Y(k),$$

where $$W_N = e^{-j\frac{2\pi}{N}},$$

z(n) represents a sampled time-domain signal sequence, $z(n)=x(n)+i \cdot y(n)$, and consists of the data x(n) and y(n) of the two polarization states orthogonal to each other, and Z(k) is a frequency-domain signal corresponding to the sampled time-domain signal sequence z(n), where $n=0, 1, \ldots, N-1$;
perform extraction of data from the frequency-domain data according to the following rules:

$$X^U[k] = X\left[k + \frac{N}{4} - \frac{M}{2}\right], X^L[k] = X\left[k + \frac{3N}{4} - \frac{M}{2}\right], \text{ and}$$

$$Y^U[k] = X\left[k + \frac{N}{4} - \frac{M}{2}\right], Y^L[k] = X\left[k + \frac{3N}{4} - \frac{M}{2}\right],$$

where $X^U[k]$ represents upper sideband data extracted from X(k), $X^L[k]$ represents lower sideband data extracted from X(k), $Y^U[k]$ represents upper sideband data extracted from Y(k), $Y^L[k]$ represents lower sideband data extracted from Y(k), $$M = \frac{N}{8},$$

where $k=0, 1, \ldots, M-1$;
perform a linear combination operation on the extracted data from the frequency-domain data to obtain a result of the linear combination operation;

obtain an argument of a CD value of the data of the two polarization states according to the result of the linear combination operation;
estimate the CD value according to the argument of the CD value of the data of the two polarization states; and
send the CD value to a CD compensation, such that the CD compensation compensates for the CD value.

6. The CD estimation device according to claim 5, wherein the processor is configured to:
1): obtain two groups of sequences $X_1^{(U)}, X_2^{(U)}$ and $X_3^{(U)}$ as well as $X_1^{(L)}, X_2^{(L)}$ and $X_3^{(L)}$ in three different directions according to $X^U[k], X^L[k], Y^U[k]$ and $Y^L[k]$:

$$\begin{cases} X_1^{(U)}[k] = \sqrt{2}\, X^{(U)}[k] \\ X_2^{(U)}[k] = X^{(U)}[k] + \sqrt{-1} \cdot Y^{(U)}[k] \\ X_3^{(U)}[k] = X^{(U)}[k] + Y^{(U)}[k] \end{cases}$$

$$\begin{cases} X_1^{(L)}[k] = \sqrt{2}\, X^{(L)}[k] \\ X_2^{(L)}[k] = X^{(L)}[k] + \sqrt{-1} \cdot Y^{(L)}[k] \\ X_3^{(L)}[k] = X^{(L)}[k] + Y^{(L)}[k] \end{cases}$$

where $k=0, 1, \ldots, N-1$;
2): perform conjugate multiplication on the two groups of sequences $X_1^{(U)}, X_2^{(U)}$ and $X_3^{(U)}$ as well as $X_1^{(L)}, X_2^{(L)}$ and $X_3^{(L)}$ to obtain a CD sub-sequence $R_1[k], R_2[k]$ and $R_3[k]$ in the three different directions:

$$R_n[k] = X_n^{(U)}[k] \cdot conj\{X_n^{(L)}[k]\},$$

where conj(•) is a conjugate operation, $k=0, \ldots N-1$ and $n=1, 2, 3$;
3): set a first interval value as $\Delta_1=2$ and a second interval value as $\Delta_2=32$, and calculate accumulated values $F_1$ and $F_2$ corresponding to these two interval values in different directions according to $R_1[k], R_2[k]$ and $R_3[k]$:

$$F_1 = \sum_{n=1}^{3} \sum_{k=0}^{N-\Delta_1} R_n[k] \cdot conj(R_n[k + \Delta_1]), \text{ and}$$

$$F_2 = \sum_{n=1}^{3} \sum_{k=0}^{N-\Delta_2} R_n[k] \cdot conj(R_n[k + \Delta_2]);$$

4): perform low-pass filtering on a number T of accumulated values $F_1$ and a number M of accumulated values $F_2$ thus obtained to get $\overline{F_1}$ and $\overline{F_2}$:

$$\overline{F_1} = \sum_{k1=0}^{T-1} F_1[k], \text{ and}$$

$$\overline{F_2} = \sum_{k2=0}^{M-1} F_2[k2],$$

where $k1=0, 1, \ldots, T-1$, and $k2=0, 1, \ldots, M-1$; and
5): construct two registers Buffer1 and Buffer2 with a length L, wherein Buffer1 stores $\overline{F_1}$ calculated for recent L times, Buffer2 stores $\overline{F_2}$ calculated for recent L times, initial values of Buffer1 and Buffer2 are both a number L of zeros, data in the Buffer1 is summed to obtain $F_{1\_sum}$, and data in Buffer2 is summed to obtain $F_{2\_sum}$.

7. The CD estimation device according to claim 6, wherein the processor is configured to calculate arguments $\varphi_1$ and $\varphi_2$ of the CD value the data of the two polarization states according to $F_{1\_sum}$ and $F_{2\_sum}$ respectively:

$$\varphi_1 = \frac{1}{2\pi}\arg(F_{1\_sum}), \text{ and}$$

$$\varphi_2 = \frac{1}{2\pi}\arg(F_{2\_sum}),$$

where both $\varphi_1$ and $\varphi_2$ belong to an interval [0,1).

8. The CD estimation device according to claim 7, wherein the processor is configured to obtain a CD estimation coefficient $\varphi_1''$ according to the arguments $\varphi_1$ and $\varphi_2$ of the CD value of the data of the two polarization states, and estimate the CD value CD according to the CD estimation coefficient $\varphi_1''$:

CD=$\varphi_1''$×delta_CD, where delta_CD=1000×C×N_fft/(2×f$^2$×lambda$^2$), C is a light velocity in an optical fibre, N_fft is a discrete Fourier transform length, f is a symbol rate, and lambda is a wavelength.

9. A non-transitory computer storage readable medium in which a computer program is stored, wherein when the computer program is executed, a processor is caused to:
receive data of two polarization states orthogonal to each other from an In-phase/Quadrature (IQ) balance;
convert the data of the two polarization states orthogonal to each other from time-domain data to frequency-domain data by adopting a discrete Fourier transform, with N=2$^t$ and t being a natural number greater than 2, and the frequency-domain data converted from the data of the two polarization states being set as X(k) and Y(k) respectively, k=0, 1, . . . , N−1, then $$Z(k) = \sum_{n=0}^{N-1} z(n)W_N^{nk}, k = 0, 1, \ldots, N-1, \text{ and}$$

$$Z(k) = X(k) + i \cdot Y(k),$$

wherein i$^2$=−1;
where $$W_N = e^{-j\frac{2\pi}{N}},$$

z(n) represents a sampled time-domain signal sequence, z(n)=x(n)+i·y(n), and consists of the data x(n) and y(n) of the two polarization states orthogonal to each other, and Z(k) is a frequency-domain signal corresponding to the sampled time-domain signal sequence z(n), where n=0, 1, . . . , N−1;
perform extraction of data from the frequency-domain data according to the following rules:

$$X^U[k] = X\left[k + \frac{N}{4} - \frac{M}{2}\right], X^L[k] = X\left[k + \frac{3N}{4} - \frac{M}{2}\right], \text{ and}$$

$$Y^U[k] = X\left[k + \frac{N}{4} - \frac{M}{2}\right], Y^L[k] = X\left[k + \frac{3N}{4} - \frac{M}{2}\right],$$

where $X^U$[k] represents upper sideband data extracted from X(k), $X^L$[k] represents lower sideband data extracted from X(k), $Y^U$[k] represents upper sideband data extracted from Y(k), $Y^L$[k] represents lower sideband data extracted from Y(k), $$M = \frac{N}{8},$$

where k=0, 1, . . . , M−1;
perform a linear combination operation on the extracted data from the frequency-domain data;
obtain an argument of a CD value of the data of the two polarization states according to a result of the linear combination operation;
estimate the CD value according to the argument of the CD value of the data of the two polarization states; and
send the CD value to a CD compensation, such that the CD compensation compensates for the CD value.

10. The non-transitory computer storage readable medium according to claim 9, wherein performing, by the processor, the linear combination operation on the extracted data from the frequency-domain data comprises:
step a: obtaining two groups of sequences $X_1^{(U)}$, $X_2^{(U)}$ and $X_3^{(U)}$ as well as $X_1^{(L)}$, $X_2^{(L)}$ and $X_3^{(L)}$ in three different directions according to $X^U$[k], $X^L$[k], $Y^U$[k] and $Y^L$[k]:

$$\begin{cases} X_1^{(U)}[k] = \sqrt{2}\, X^{(U)}[k] \\ X_2^{(U)}[k] = X^{(U)}[k] + \sqrt{-1} \cdot Y^{(U)}[k] \\ X_3^{(U)}[k] = X^{(U)}[k] + Y^{(U)}[k] \end{cases}$$

$$\begin{cases} X_1^{(L)}[k] = \sqrt{2}\, X^{(L)}[k] \\ X_2^{(L)}[k] = X^{(L)}[k] + \sqrt{-1} \cdot Y^{(L)}[k] \\ X_3^{(L)}[k] = X^{(L)}[k] + Y^{(L)}[k] \end{cases}$$

where k=0, 1, . . . , N−1;
step b: performing conjugate multiplication on the two groups of sequences $X_1^{(U)}$, $X_2^{(U)}$ and $X_3^{(U)}$ as well as $X_1^{(L)}$, $X_2^{(L)}$ and $X_3^{(L)}$ to obtain a CD sub-sequence $R_1$[k], $R_2$[k] and $R_3$[k] in the three different directions:

$R_n[k]=X_n^{(U)}[k]\cdot\text{conj}\{X_n^{(L)}[k]\},$ where conj(•) is a conjugate operation, k=0, . . . N−1 and n=1, 2, 3;
step c: setting a first interval value as $\Delta_1$=2 and a second interval value as $\Delta_2$=32, and calculating accumulated values $F_1$ and $F_2$ corresponding to these two interval values in different directions according to $R_1$[k], $R_2$[k] and $R_3$[k]:

$$F_1 = \sum_{n=1}^{3} \sum_{k=0}^{N-\Delta_1} R_n[k]\cdot conj(R_n[k+\Delta_1]), \text{ and}$$

$$F_2 = \sum_{n=1}^{3} \sum_{k=0}^{N-\Delta_2} R_n[k]\cdot conj(R_n[k+\Delta_2]);$$

step d: performing low-pass filtering on a number T of accumulated values $F_1$ and a number M of accumulated values $F_2$ thus obtained to get $\overline{F}_1$ and $\overline{F}_2$:

$$\overline{F_1} = \sum_{k1=0}^{T-1} F_1[k1], \text{ and}$$

$$\overline{F_2} = \sum_{k2=0}^{M-1} F_2[k2],$$

where k1=0, 1, . . . , T−1, and k2=0, 1, . . . , M−1; and step e: constructing two registers Buffer1 and Buffer2 with a length L, wherein Buffer1 stores $\overline{F}_1$ calculated for recent L times, Buffer2 stores $\overline{F}_2$ calculated for recent L times, initial values of Buffer1 and Buffer2 are both a number L of zeros, data in the Buffer1 is summed to obtain $F_{1\_sum}$, and data in Buffer2 is summed to obtain $F_{2\_sum}$:

$$F_{1\_sum} = \sum_{k=1}^{L} \overline{F_1}[k], \text{ and}$$

$$F_{2\_sum} = \sum_{k=1}^{L} \overline{F_2}[k],$$

here, a value of L is selected from [16, 32, 64, 128].

11. The non-transitory computer storage readable medium according to claim 10, wherein obtaining, by the processor, the argument of the CD value of the data of the two polarization states according to the result of the linear combination operation comprises: calculating arguments $\varphi_1$ and $\varphi_2$ of the CD value of the data of the two polarization states according to $F_{1\_sum}$ and $F_{2\_sum}$ respectively:

$$\varphi_1 = \frac{1}{2\pi}\arg(F_{1\_sum}), \text{ and}$$

$$\varphi_2 = \frac{1}{2\pi}\arg(F_{2\_sum}),$$

where both $\varphi_1$ and $\varphi_2$ belong to an interval [0,1).

12. The non-transitory computer storage readable medium according to claim 11, wherein estimating, by the processor, the CD value according to the argument of the CD value of the data of the two polarization states comprises:
obtaining a CD estimation coefficient $\varphi_1''$ according to the arguments $\varphi_1$ and $\varphi_2$ of the CD value of the data of the two polarization states, and estimating the CD value CD according to the CD estimation coefficient $\varphi_1''$:

CD=$\varphi_1''$×delta_CD, where delta_CD=1000×C×N_fft/(2×f$^2$×lambda$^2$), C is a light velocity in an optical fibre, N_fft is a discrete Fourier transform length, f is a symbol rate, and lambda is a wavelength.

* * * * *